(12) United States Patent
Hiscock (10) Patent No.: US 8,675,710 B2
(45) Date of Patent: Mar. 18, 2014

(54) CHIRP RECEIVER

(75) Inventor: Paul Dominic Hiscock, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/597,062

(22) Filed: Aug. 28, 2012

(65) Prior Publication Data

US 2013/0051433 A1    Feb. 28, 2013

(30) Foreign Application Priority Data

Aug. 30, 2011    (GB) ................... 1114880.6

(51) Int. Cl.
*H04B 1/00*    (2006.01)

(52) U.S. Cl.
USPC ........................ 375/139; 375/219; 375/354

(58) Field of Classification Search
USPC ........................ 375/139, 219, 354
See application file for complete search history.

(56) References Cited

U.S. PATENT DOCUMENTS

| | | | |
|---|---|---|---|
| 6,628,697 B1 | 9/2003 | Douglas et al. | |
| 7,245,930 B1 * | 7/2007 | Vishwanath et al. | 455/502 |
| 2004/0260506 A1 * | 12/2004 | Jones et al. | 702/150 |
| 2005/0226312 A1 * | 10/2005 | Koslar et al. | 375/142 |

FOREIGN PATENT DOCUMENTS

GB    2490140 A    10/2012

OTHER PUBLICATIONS

Search Report, in Great Britain Patent Application No. GB1114880.6 mailed Nov. 27, 2012.

* cited by examiner

*Primary Examiner* — Ted Wang
(74) *Attorney, Agent, or Firm* — Frommer Lawrence & Haug LLP; John W. Branch (57) ABSTRACT

A method of synchronizing the frequency and timing of a receiver with a synchronization chirp signal from a transmitter, comprising: receiving the synchronization chirp signal, the synchronization chirp signal comprising a sequence of symbols, the sequence of symbols including at least a first symbol having a first gradient $g_1$ and a second symbol having a second gradient $g_2$, wherein the magnitudes of the first gradient and the second gradient are both greater than one, and the magnitude of the first gradient is different to the magnitude of the second gradient; correlating the sequence of received symbols with expected symbols to form a correlator output; determining timing and frequency offsets between the transmitter and the receiver from the correlator output; and adjusting the timing and frequency of the receiver by the determined timing and frequency offsets.

20 Claims, 7 Drawing Sheets

CHIRP RECEIVER

CROSS-REFERENCE TO RELATED APPLICATIONS

This application claims priority to U.K. Patent Application Serial No. 1114880.6 filed on Aug. 30, 2011, the contents of which are incorporated herein by reference.

FIELD OF THE INVENTION

The present disclosure relates to synchronising a chirp transmitter and a chirp receiver.

BACKGROUND OF THE INVENTION

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g,p) = e^{j\pi g(n - fn(p))(n+1 - fn(p))/N} \quad \text{(equation 1)}$$

where g is the gradient of the chirp, N is the number of samples in the sequence, n is a sample in the sequence, p is a symbol value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Figure 1:
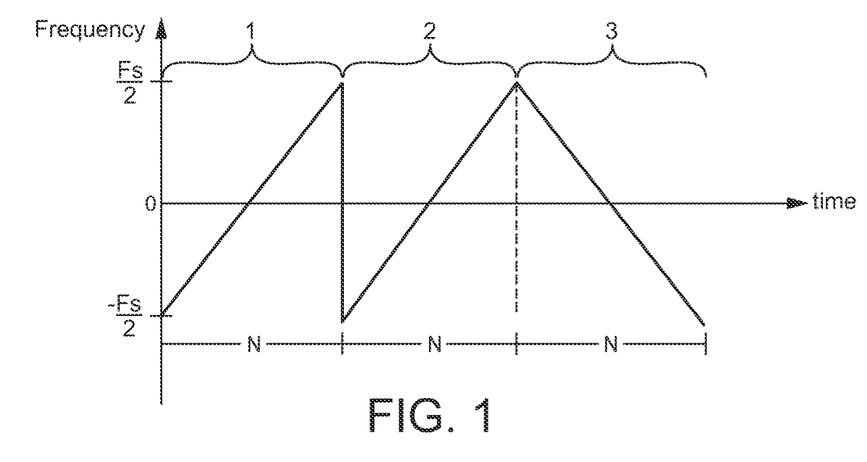
FIG. 1 illustrates a sequence of chirps in the frequency-time plane.

Chirp 1 in FIG. 1 has a starting frequency of −Fs/2 and a gradient of 1. It increases linearly in frequency over a period of N samples at a sample rate of Fs to reach a frequency close to +Fs/2. Since this is a complex sampled system +Fs/2 is the same as −Fs/2. Multiple chirps are usually contiguous but may start with a different frequency. The signal phase is typically made continuous throughout a sequence of chirps. In other words, after the signal has reached +Fs/2 at n=N−1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Figure 2:
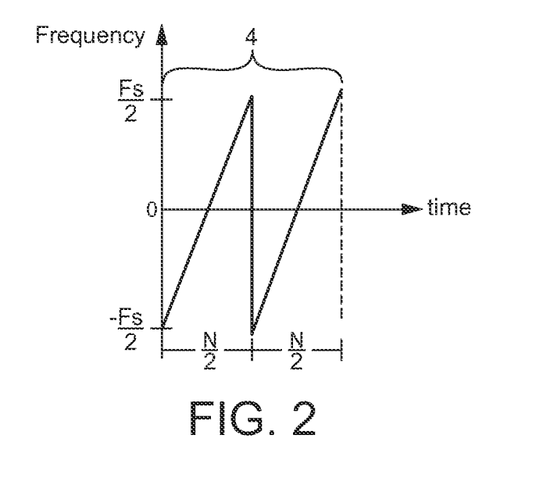
FIG. 2 illustrates a chirp having a gradient of 2 in the frequency-time plane.

Chirp 4 in FIG. 2 has a gradient of 2 and a starting frequency of −Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from −Fs/2 to +Fs/2 between samples N/2 and N.

The chirps also have continuous frequency and phase from one end of the chirp to the other. A cyclic shift of the samples that make up a chirp creates another valid chirp.

Figure 3A:
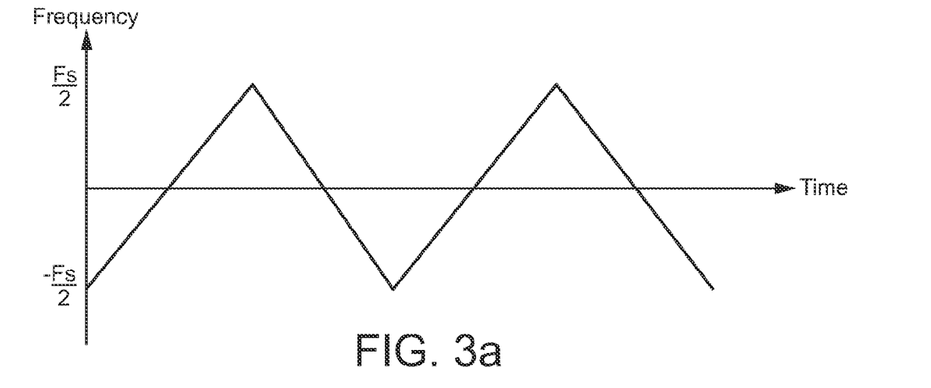
FIGS. 3a and 3b illustrate a known synchronisation signal and method.
Figure 3B:
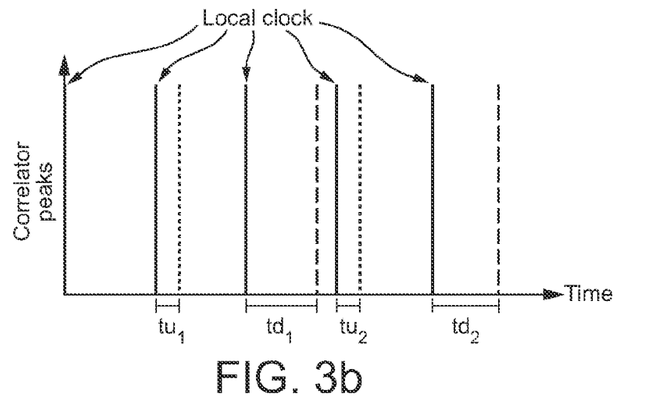

It is known to synchronise communications between a chirp transmitter and a chirp receiver by sending a synchronisation signal from the transmitter which consists of a sequence of up and down chirps having unity gradient. This concept is illustrated on FIG. 3a. The received synchronisation signal is correlated twice, firstly against a reference up chirp and secondly against a reference down chirp. This yields a set of correlation peaks for the up chirps (tu) and a set of correlation peaks for the down chirps (td). The peak positions are recorded relative to a fixed local clock, as illustrated on FIG. 3b. The start of a chirp with respect to the local clock ts and the frequency offset between the transmitter and receiver fs can be determined using the to and td results for pairs of correlated chirps according to the following simultaneous equations:

$$fs = (t_1 - t_2)k \quad \text{(equation 2)}$$

$$ts = \frac{(t_1 + t_2)}{2} \quad \text{(equation 3)}$$

where t1 is the number of samples between a local reference and the position of the up chirp peaks, t2 is the number of samples between a local reference and the position of the down chirp peaks, ts is the time offset in samples, and k is a factor relating the gradient of the chirp to the linear change in frequency over time. For example, if k is N/2Fs, then fs is in Hz. This described synchronisation method determines both the timing and frequency offsets of the transmitter and the receiver.

A problem with this described synchronisation method is that in a multi-user system sharing spectral resources, typically several devices try to send synchronisation signals simultaneously. Consequently, a receiver receives multiple synchronisation signals from different transmitters at the same time. The receiver is unable to distinguish which synchronisation signal is meant for it because all the synchronisation signals have the same form as that illustrated in FIG. 3a. Consequently, the likelihood of the receiver synchronising to the wrong transmitter or failing to synchronise at all is high. For example, if multiple transmitters send unity gradient up chirps and down chirps, then a receiver that is listening only for unity up and unity down chirps may synchronise to the wrong transmitter. In a conventional system this incorrect connection may be resolved by, for example, exchanging and confirming addresses in an additional header packet. However, in a chirp communication system where messages are typically very short and symbols may be several milliseconds long, this overhead in exchanging header information causes increased latency and additional spectral pollution. Additionally, this overhead in exchanging header information requires more processing and transmit power.

Thus, there is a need for an improved method of synchronising chirp communications between a transmitter and a receiver that achieves both timing and frequency synchronisation in a multi-user system and reduces the amount of additional information exchanged between the transmitter and receiver.

SUMMARY OF VARIOUS EMBODIMENTS

According to a first aspect, there is provided a method of synchronising the frequency and timing of a receiver with a synchronisation chirp signal from a transmitter, comprising: receiving the synchronisation chirp signal, the synchronisation chirp signal comprising a sequence of symbols, the sequence of symbols including at least a first symbol having a first gradient $g_1$ and a second symbol having a second gradient $g_2$, wherein the magnitudes of the first gradient and the second gradient are both greater than one, and the magnitude of the first gradient is different to the magnitude of the second gradient; correlating the sequence of received symbols with expected symbols to form a correlator output; determining timing and frequency offsets between the transmitter and the receiver from the correlator output; and adjusting the relative timing and frequency of the receiver and the synchronisation signal by the determined timing and frequency offsets.

Suitably, determining the timing and frequency offsets comprises determining fractional timing and frequency offsets between the transmitter and the receiver.

Suitably, each received symbol comprises one or more identical chirps, each chirp having N samples, and the fractional timing offset is a function of the magnitude of the correlator output at the expected integer timing offset and a function of the magnitude of the correlator output at g samples from the expected integer timing offset.

In this context, integer timing and frequency offsets are typically measurements made using only the whole sample (integer) position of the largest correlation peak when sampled at Fs Hz.

Suitably, the fractional timing offset is a function of the magnitude of the correlator output at the expected integer timing offset and a function of the magnitude of the correlator output at g samples prior to the expected integer timing offset.

Suitably, the fractional timing offset is a function of the magnitude of the correlator output at the expected integer timing offset and a function of the magnitude of the correlator output at g samples after the expected integer timing offset.

Suitably, each received symbol comprises one or more identical chirps, each chirp having N samples, and the fractional frequency offset is a function of the magnitude of the correlator output at the expected integer timing offset and a function of the magnitude of the correlator output at one sample from the expected integer timing offset.

Suitably, the fractional frequency offset is a function of the magnitude of the correlator output at the expected integer timing offset and a function of the magnitude of the correlator output at one sample prior to the expected integer timing offset.

Suitably, the fractional frequency offset is a function of the magnitude of the correlator output at the expected integer timing offset and a function of the magnitude of the correlator output at one sample after the expected integer timing offset.

Suitably, determining the timing and frequency offsets comprises determining integer timing and frequency offsets between the transmitter and the receiver.

Suitably, the method comprises determining integer timing and frequency offsets from the correlator peak position of the first symbol and the correlator peak position of the second symbol.

Suitably, the sequence of symbols comprises at least the first symbol, the second symbol and a third symbol having a third gradient $g_3$, wherein the magnitude of the third gradient is greater than one, and the magnitude of the third gradient is different to the magnitudes of the first and second gradients, and the method comprises determining more than one set of integer timing and frequency offsets between the transmitter and the receiver, and adjusting the relative timing and frequency of the receiver and the synchronisation signal by the most frequently determined timing and frequency offsets.

Suitably, the step of correlating comprises correlating each received symbol in the sequence of received symbols with an expected symbol having a gradient matching the expected gradient of the received symbol.

Suitably, the step of correlating comprises: mixing the first symbol with a generated symbol having a gradient $1-g_1$ to form a first mixed symbol; mixing the second symbol with a generated symbol having a gradient $1-g_2$ to form a second mixed symbol; and correlating both the first mixed symbol and the second mixed symbol with a symbol having unity gradient.

Suitably, each symbol comprises at least two identical chirps.

Suitably, prior to receiving the synchronisation chirp signal, the method comprises negotiating the gradients of the symbols in the synchronisation chirp signal between the transmitter and the receiver.

Suitably, the method further comprises: buffering the received symbols; after the step of adjusting the relative timing and frequency of the receiver and the synchronisation signal, extracting the buffered received symbols; correlating the sequence of buffered received symbols with expected symbols to form a correlator output; determining timing and frequency offsets between the transmitter and the receiver from the correlator output; and adjusting the relative timing and frequency of the receiver and the synchronisation signal by the determined timing and frequency offsets.

Suitably, the method further comprises: buffering the received symbols; after the step of adjusting relative timing and frequency of the receiver and the synchronisation signal, extracting the buffered received symbols; applying fractional time offsets and fractional frequency offsets to the extracted buffered received symbols to form a set of offset received symbols; correlating the sequence of offset received symbols with expected symbols to form a correlator output; determining timing and frequency offsets between the transmitter and the receiver from the correlator output; and adjusting the relative timing and frequency of the receiver and the synchronisation signal by the determined timing and frequency offsets.

According to a second aspect, there is provided a chirp receiver comprising: a receiving unit configured to receive a synchronisation chirp signal, the synchronisation chirp signal comprising a sequence of symbols, the sequence of symbols including at least a first symbol having a first gradient $g_1$ and a second symbol having a second gradient $g_2$, wherein the magnitudes of the first gradient and the second gradient are both greater than one, and the magnitude of the first gradient is different to the magnitude of the second gradient; a correlator configured to correlate the sequence of received symbols with expected symbols to form a correlator output; a determination unit configured to determine timing and frequency offsets between the transmitter and the receiver from the correlator output; and an adjustment unit configured to adjust the relative timing and frequency of the receiver and the synchronisation signal by the determined timing and frequency offsets.

Suitably, the determination unit is configured to determine fractional timing and frequency offsets between the transmitter and the receiver.

Suitably, the determination unit is configured to determine the integer timing and frequency offsets between the transmitter and the receiver.

Suitably, the correlator is configured to correlate each received symbol in the sequence of received symbols with an expected symbol having a gradient matching the gradient of the received symbol.

Suitably, the correlator is configured to: mix the first symbol with a generated symbol having a gradient $1-g_1$ to form a first mixed symbol; mix the second symbol with a generated symbol having a gradient $1-g_2$ to form a second mixed symbol; and correlate both the first mixed symbol and the second mixed symbol with a symbol having unity gradient.

Suitably, the receiver further comprises a processor configured to negotiate the gradients of the symbols in the synchronisation chirp signal between the transmitter and the receiver.

Suitably, the receiver further comprises a buffer configured to buffer the received symbols.

Suitably, the receiver further comprises: a buffer configured to buffer the received symbols; a linear interpolator configured to apply fractional time offsets to the buffered received symbols; and a mixer configured to apply a fractional frequency offset to the buffered received symbols.

BRIEF DESCRIPTION OF THE DRAWINGS

The following disclosure will now be described by way of example with reference to the accompanying drawings. In the drawings.

DESCRIPTION OF THE VARIOUS EMBODIMENTS

The following disclosure is directed at a method of synchronising a receiver to a transmitter for chirp communications. Each symbol of a chirp signal has a plurality of configurable properties, one of which is its gradient. A synchronisation signal is sent from the transmitter to the receiver. The synchronisation signal includes at least two symbols having gradients with different magnitudes. Preferably, the sequence of gradients in the synchronisation signal is pre-agreed between the transmitter and receiver. The receiver receives the synchronisation signal and correlates it with an expected synchronisation signal. The receiver determines the timing and frequency offsets between the transmitter and the receiver from the correlator output, and adjusts the relative timing and frequency of the receiver and the synchronisation signal by the determined offsets. Different sets of transmitters and receivers in the system pre-agree different sequences of gradients for the synchronisation signals. Suitably, broadcast transmitters use publically known synchronisation sequences that any receiver can synchronise and then listen to. Therefore, a receiver is able to quickly determine if a synchronisation signal is intended for it by determining if the signal has the expected gradient sequence. If other users are transmitting different gradient chirps in the same radio frequency band and at the same time as a wanted transmitter, a receiver can synchronise to the wanted transmitter because the correlation process amplifies the expected gradient sequence and rejects unwanted gradient sequences. Thus, the interference caused by synchronisation signals associated with other users in the system is substantially reduced, enabling multiple receivers in the same system to achieve frequency and timing synchronisation. The process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g, p) = e^{j\pi g(n-fn(p))(n+1-fn(p))/N} \quad \text{(equation 1)}$$

where g is the gradient of the chirp, N is the number of samples in the sequence, n is a sample in the sequence, p is a symbol value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

In the synchronisation method described herein, a transmitter generates a synchronisation signal comprising a sequence of symbols. Each symbol comprises one or more identical chirps. Preferably, each symbol comprises two or more identical chirps. The chirps are generated in accordance with equation 1. The symbol value p of the chirp, from equation 1, is known to both the transmitter and receiver and is typically zero. Preferably, prior to generating the synchronisation signal at the transmitter, the transmitter and receiver pre-agree a set of two or more symbol gradients to be used in the synchronisation signal. Suitably, the transmitter and receiver negotiate these gradients. Alternatively the gradients may be publically known or privately known. Suitably, the transmitter and receiver also negotiate other configurable properties of the signal, for example the bandwidth of each symbol, the center frequency of each symbol, the number of times a chirp is repeated in a symbol, and the number of samples N in each chirp. The magnitudes of the pre-agreed gradients are greater than one. Preferably, the magnitudes of the pre-agreed gradients are less than N. Typically, the gradients are greater than two. The magnitudes of at least two of the pre-agreed gradients are different. Preferably, the synchronisation signal includes more than two symbols, and the magnitude of the symbol gradient of each symbol is different to the magnitude of the symbol gradient of a different symbol. The transmitter transmits the generated synchronisation signal to the receiver.

A receiver intending to listen to a particular transmitter is first configured to listen for the sequence of wanted chirp gradients from that transmitter. This sequence may occur infrequently. Thus, suitably the receiver listens continuously. The receiver fills its receive buffer with radio samples equivalent to a whole chirp in length. Since the timing is unknown, the receive buffer may contain any one or combination of the following:

1) Radio noise should the transmitter be off.
2) A chirp from the wanted transmitter but with the wrong gradient. This may occur, for example, because the transmitter is in the middle of a previous transmission.
3) Part radio noise and part of a wanted chirp (as the transmitter turns on).
4) Part of a wanted chirp and part of a subsequent chirp with a different gradient.
5) A complete chirp with the wanted gradient.

In order to synchronise, suitably the receiver receives a complete chirp with the same and wanted gradient. Preferably, the transmitter sends two or more identical and contiguous chirps. Thus, the receiver detects a complete chirp even in this unsynchronised state. If less than two chirps are sent or if only a partial chirp is received then correlation may be possible but is less sensitive.

Figure 4:
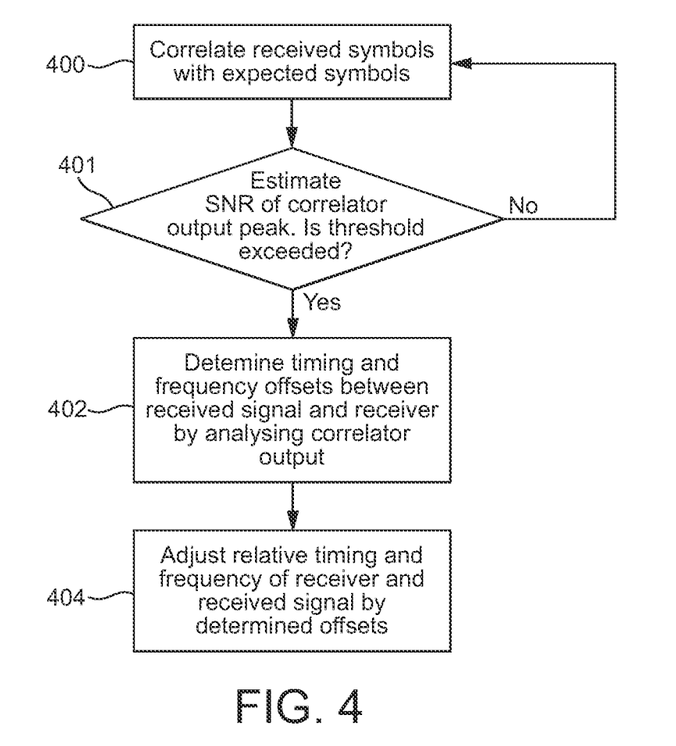
FIG. 4 is a flow chart illustrating a method of synchronising a chirp receiver to a synchronisation signal received from a chirp transmitter.

Reference is now made to FIG. 4 which illustrates the pertinent steps of a method of synchronising a receiver to a received synchronisation signal of the form described in the preceding paragraphs. At step 400, the receiver correlates the received symbols in the synchronisation signal with the expected symbols. Preferably, this correlation is performed by first multiplying each received chirp C(g) with a generated chirp C(1−g) having a gradient 1 minus the gradient of the received chirp, so as to result in a multiplied chirp having unity gradient. Suitably, each multiplied chirp in the resulting sequence of multiplied chirps is then correlated with a generated chirp having unity gradient. Alternatively, the correlation is performed by correlating each received chirp with an expected chirp having a gradient matching the gradient of the received chirp. Preferably, this expected chirp is a conjugate of the received chirp. Preferably, the correlator is a cyclic correlator. The correlator performs a correlation between the generated unity chirp and N cyclic phases of the multiplied chirp (or received chirp), generating N outputs. N is the number of samples in a chirp. The correlator outputs a strong correlation peak when the cyclic phase of the multiplied chirp (or received chirp) matches that of the generated unity chirp and smaller values in other positions At step 401, the receiver determines whether the receiver has correctly identified the two or more chirps with wanted gradients. It does this by estimating the signal to noise ratio of the correlator output peak and comparing it to a threshold. If the threshold is not exceeded then step 400 may be repeated. If the threshold is exceeded, the method moves onto step 402. Suitably, where there are more than two symbols in the synchronisation sequence, and one or more of the correlator peaks has an estimated signal to noise ratio that is below the threshold and two or more of the correlator peaks have an estimated signal to noise ratio that is above the threshold, the receiver attempts synchronisation. This is because there may be sufficient information to proceed. For example, one chirp may have been corrupted by a Bluetooth transmission, but the other chirps may be acceptable.

At step 402, the receiver determines timing and frequency offsets between the transmitter and the receiver by analysing the correlator output. For example, the receiver analyses the position of the largest peak and the magnitudes of specific neighbours that are defined below. Suitably, these offsets are integer offsets. Alternatively, these offsets are fractional offsets. Preferably, these offsets are both integer and fractional offsets.

Figure 5:
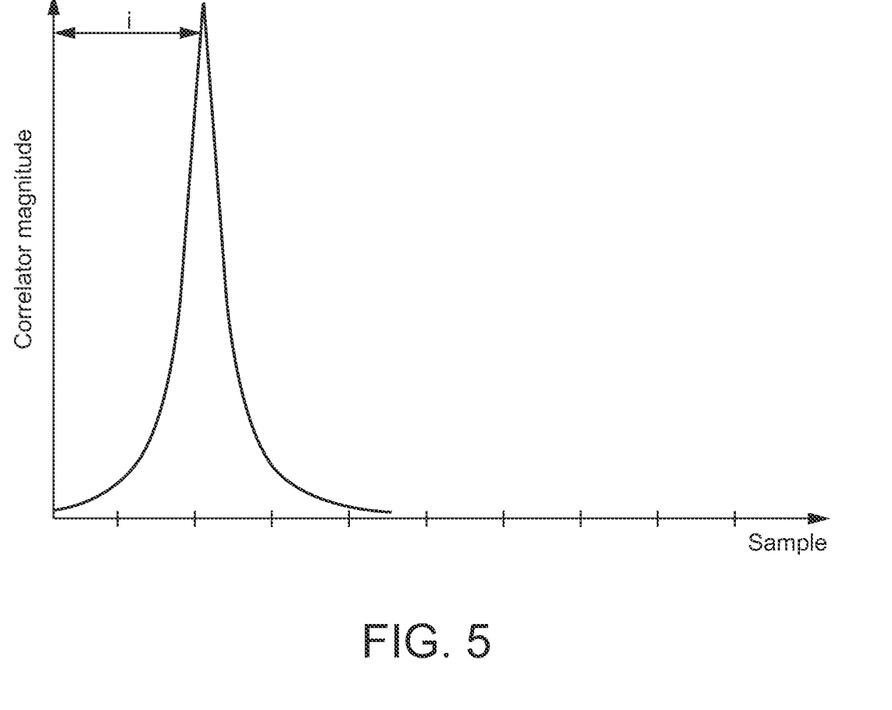
FIG. 5 illustrates a correlator output.

FIG. 5 illustrates a correlator output. The position of the correlation peak in samples i for a symbol n is a function of the integer timing offset and the integer frequency offset. Preferably, the received signal is first multiplied by the conjugate of a chirp with gradient $g_n-1$ and then cyclically correlated with the conjugate of a unity gradient chirp. In this case the expected integer position of the correlator peak output, for the nth symbol, $i_n$, is given by:

$$i_n = g_n \lfloor t \rfloor - \lfloor f \rfloor (\mathrm{mod} N) \qquad \text{(equation 4)}$$

where $g_n$ is the gradient of the nth symbol, and $\lfloor t \rfloor$ is the integer timing offset in samples, and $\lfloor f \rfloor$ is the integer frequency offset, expressed in samples, where a sample is equivalent to Fs/N Hz and where N is the number of samples in a chirp and where Fs is the sample rate in Hz. The receiver determines the integer timing and frequency offsets by analysing the correlator peak positions of at least two received symbols having gradients with different magnitudes.

For the first correlation peak of the first symbol:

$$i_1 = g_1 \lfloor t \rfloor - \lfloor f \rfloor (\mathrm{mod} N) \qquad \text{(equation 5)}$$

For the second correlation peak of the second symbol:

$$i_2 = g_2 \lfloor t \rfloor - \lfloor f \rfloor (\mathrm{mod} N) \qquad \text{(equation 6)}$$

Consequently, $$\lfloor t \rfloor = (i_1 - i_2)(g_1 - g_2)^{-1} (\mathrm{mod} N) \qquad \text{(equation 7)}$$

$$\lfloor f \rfloor = g_1 \lfloor t \rfloor - i_1 (\mathrm{mod} N) \qquad \text{(equation 8)}$$

In environments with low signal level or in the presence of interference the peak position may be incorrectly determined. This could lead to an incorrect synchronisation.

Suitably, more than two symbols with different gradients are transmitted. This improves the synchronisation robustness as follows. For each further symbol n, the correlation peak is given by equation 4. Pairs of simultaneous equations 4 are solved to obtain a set of integer offset estimates for both time and frequency. In good signal conditions all the integer time offset estimates are the same, and all the integer frequency offset estimates are the same. However, in poor signal conditions one or more of the symbols may be corrupted either by noise or by interference. In this case some of the peak positions may be wrong, and hence the integer time and frequency offset estimates may be wrong. In this case, the integer time and frequency offset estimates that occur most frequently are selected. Thus, missing or corrupt symbols can be mitigated. Suitably, the ratio of the number of times the most frequent integer time and frequency offset estimates are obtained to the number of times other offset estimates are obtained is used as a measure of the confidence in the synchronisation procedure.

Suitably, more than two chirps per symbol are transmitted. Preferably, the chirps of a symbol are identical. This improves the synchronisation sensitivity as follows. Consecutive correlator outputs are averaged using a filter. Suitably, the filter is either an FIR or IIR filter. Suitably, the results are combined coherently. Alternatively, the results are combined non-coherently from the absolute values of the correlator outputs. Preferably, coherent integration is applied if the frequency offset is below a threshold value. Preferably, non-coherent integration is applied if the frequency offset is above a threshold value. As multiple identical chirps pass through the averaging filter the magnitude of the peaks in successive correlator outputs increases to a maximum, before falling to a minimum between symbols. The correlator output set containing the maximum peak is selected. Thus, the signal to noise ratio, and hence the sensitivity of the synchronisation procedure is increased.

Figure 6A:
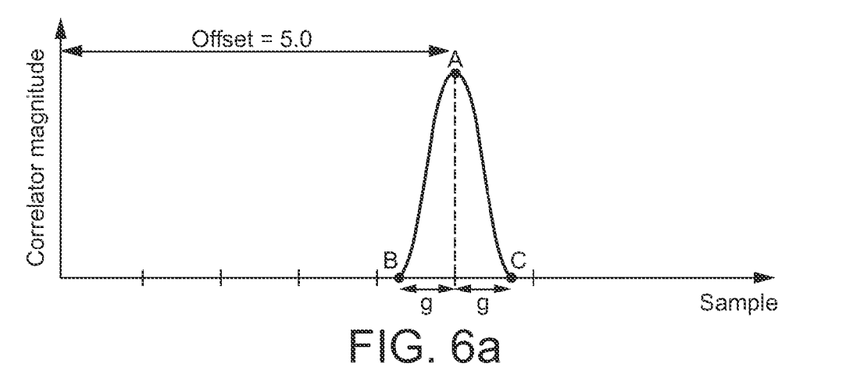
FIG. 6 illustrates fractional timing offsets of different correlator outputs.
Figure 6B:
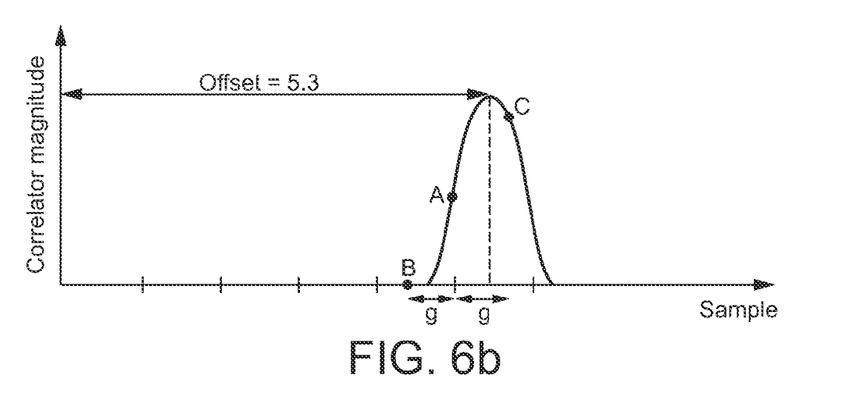
Figure 6C:
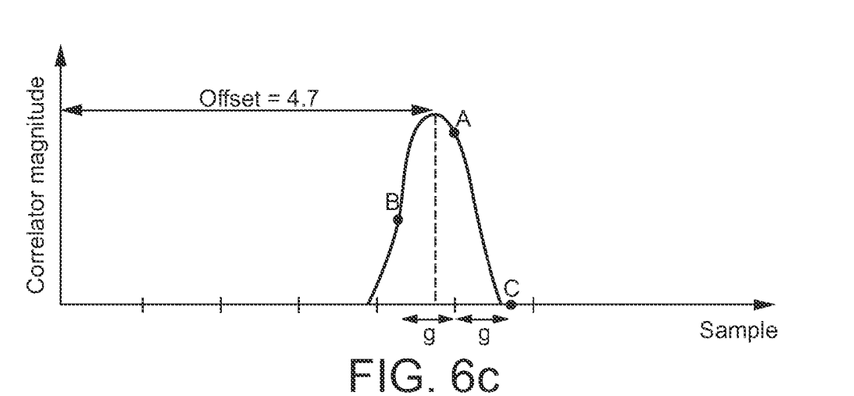

The fractional timing offset is a function of the magnitude of the correlator output at: the expected integer timing offset; g samples preceding the expected integer timing offset; and g samples after the expected integer timing offset (where g is the gradient of the received symbol). FIGS. 6a, 6b and 6c illustrate this concept. In FIG. 6, the expected integer timing offset is 5.0. In FIG. 6a, the actual timing offset is 5.0. In FIG. 6b, the actual timing offset is 5.3. In FIG. 6c, the actual timing offset is 4.7. The magnitude of the correlator output at the sample position corresponding to the timing offset of 5.0 (illustrated by A in the figures) and the magnitude of the correlator output g samples either side of this sample position (illustrated by B and C in the figures) are recorded.

Mathematically:

$$A = c[i_n] \quad \text{(equation 9)}$$

$$B = c[i_n - g_n (\text{mod} N)] \quad \text{(equation 10)}$$

$$C = c[i_n + g_n (\text{mod} N)] \quad \text{(equation 11)}$$

Where c[0] is the first sample in the correlator output.

The actual correlation peak position within these 2 g samples (and hence the fractional timing offset) is estimated by substituting the recorded values A, B and C into an equation which describes the profile of the correlator output in the vicinity of the peak position. The profile of the correlation peak is described by a suitable model. The choice of model depends on the processing power available and the accuracy desired. For example, a model that is relatively low power but also relatively approximate is a triangular function. A model that is higher power but more accurate is based on a sync function. An even more accurate model takes into account the overall channel response between the transmitter and receiver.

Similarly, the fractional frequency offset is a function of the magnitude of the correlator output at: the expected integer timing offset (A); 1 sample preceding the expected integer timing offset (D); and 1 sample after the expected integer timing offset (E).

Mathematically:

$$A = c[i_n] \quad \text{(equation 9)}$$

$$D = c[i_n - 1 (\text{mod} N)] \quad \text{(equation 12)}$$

$$E = c[i_n + 1 (\text{mod} N)] \quad \text{(equation 13)}$$

The actual correlation peak position (and hence the fractional frequency offset) within these 2 samples is estimated by substituting the recorded values A, D and E into an equation which describes the profile of the correlator output in the vicinity of the peak position. The profile of the correlation peak is described by a suitable model. The choice of model depends on the processing power available and the accuracy desired. For example, a model that is relatively low power but also relatively approximate is a triangular function. A model that is higher power but more accurate is based on a sync function.

Combination of the integer and fractional timing offsets yields a total time offset. Similarly, combination of the integer and fractional frequency offsets yields a total frequency offset. At step 404 in FIG. 4, the relative timing and frequency of the receiver and the synchronisation signal is adjusted by the determined offsets. Suitably, the relative timing and frequency of the receiver and the synchronisation signal is adjusted for both the integer and fractional offsets. Alternatively, the relative timing and frequency of the receiver and the synchronisation signal is adjusted for the integer offset only.

If, at step 400, the correlation is performed by correlating each received chirp with a conjugate of the received chirp, then the expected integer position of the correlator peak output, for the nth symbol, $i_n$, is given by:

$$i_n = \lfloor t \rfloor - g_n \lfloor f \rfloor (\text{mod} N) \quad \text{(equation 14)}$$

Equations 5 to 13 are similarly modified.

Alternatively, at step 400, the received signal having a gradient of $g_n$ may be multiplied with the conjugate of a chirp having a gradient $g_a$, where $1 < |g_a| < N$, and then cyclically correlated with the conjugate of a chirp having a gradient of $g_n - g_a$.

Figure 7:
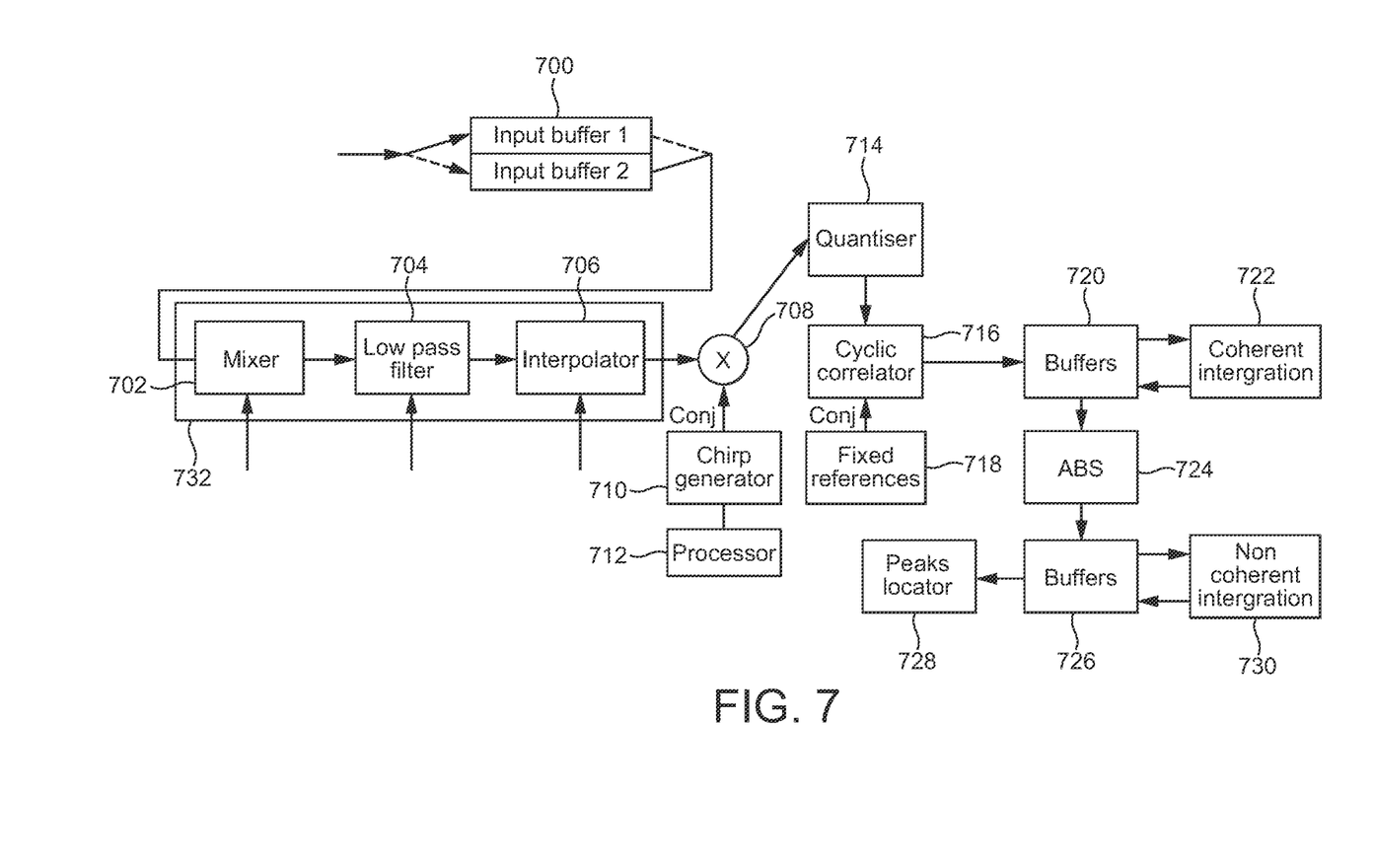
FIG. 7 illustrates a schematic diagram of a chirp receiver.

Reference is now made to FIG. 7 which is a schematic diagram of the exemplary components of a chirp receiver for implementing the synchronisation method described herein. FIG. 7 incorporates further components which are not necessarily required to implement the synchronisation method described herein.

A chirp synchronisation signal including at least two symbols is received at the chirp receiver and the samples of a received chirp of the chirp signal are input to buffer module 700. Suitably, buffer module 700 comprises two buffers. This enables an input buffer to be receiving samples whilst the output buffer is being read. When the input buffer becomes full the two buffers are swapped over so that input samples can continue to be sampled and stored without loss. The output buffer may be read multiple times. With suitably fast digital processing clock rates these buffers can provide a means to decode and track received chirps in real time.

The received chirp samples output from the buffer module 700 are input to adjustment unit 732 which will be described later. The chirp samples output from adjustment unit 732 are input to chirp multiplier 708. Under the control of processor 712, chirp generator 710 generates a reference chirp which has a gradient g' which differs from the expected gradient g of the chirp output from the buffer module 700 by a fixed value v. Preferably, this fixed value is 1. Preferably, g'=−1−g. Preferably, the reference chirp has the same number of samples in a chirp N, sample rate (bandwidth) and center frequency as the chirp output from the buffer module 700 is expected to have by the receiver.

Prior to receiving the synchronisation signal at the receiver, the processor 712 pre-agrees the gradients of the symbols in the synchronisation signal with the transmitter of the synchronisation signal. Hence, the processor is able to control the chirp generator to generate chirps that are related to the received chirps as described.

Suitably, the chirp multiplier 708 multiplies the received chirp with the conjugate of the reference chirp generated by chirp generator 710. The multiplied chirp output from the chirp multiplier 708 is input to quantiser 714. The output of the quantiser is input to correlator 716.

Figure 8:
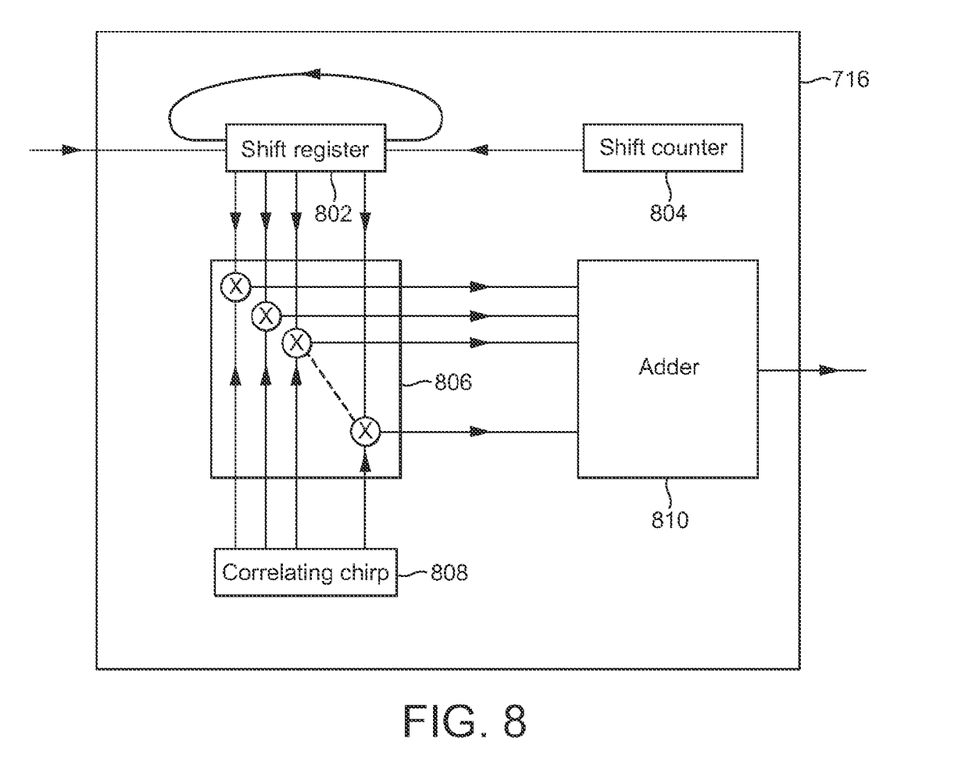
FIG. 8 illustrates an exemplary correlator.

Suitably, the correlator 716 correlates the multiplied chirp with a conjugate of the fixed correlating chirp. The fixed correlating chirp has a gradient which is equal to the fixed value v. The fixed correlating chirp is stored in store 718. Preferably, the fixed correlating chirp has unity gradient. FIG. 8 illustrates a more detailed diagram of an exemplary correlator 716. The N samples of the multiplied chirp signal output from chirp multiplier 708 are first loaded into N-stage circular shift register 802. The fixed gradient correlating chirp signal consists of one chirp of N samples which are preloaded into correlating chirp module 808. The shift counter 804 is preloaded with the number of shifts, and hence the number of outputs of correlator 716. During normal operation shift counter 804 is preloaded with N, but when using reduced symbol alphabets or if N is non-prime then shift counter 804 could be less than N. The correlator 716 comprises N complex multipliers 806, each taking a complex input from the N-stage circular shift register 802 samples, and the corresponding complex input from the correlating chirp module 808. The output from the N complex multipliers is then summed at adder 810 to yield a single complex correlator sample that is output from the correlator 716. For each successive correlation, the N-stage circular shift register 802 rotates by one. If the sample at the beginning of the N-stage circular shift register is s for one correlation, then the sample at the beginning of the N-stage circular register is s−1 for the next correlation. In this way, the correlator performs a correlation between the fixed gradient correlating chirp and N cyclic phases of the multiplied chirp, generating N outputs. When the received chirp, the reference chirp and fixed correlating chirp have gradients such that $g' \neq v-g$, then the correlator outputs small values for all cyclic phases. This is the case when the chirp receiver is not configured to correctly receive the chirp signal. When the received chirp, the reference chirp and fixed correlating chirp have gradients such that $g'=v-g$, the correlator outputs a strong correlation peak when the cyclic phase of the multiplied chirp matches that of the fixed gradient correlating chirp and smaller values in other positions.

In an alternative implementation, the received chirps are not mixed with reference chirps to form chirps having a unity gradient. In this alternative implementation, each received chirp is correlated with a correlating chirp having a gradient matching the expected gradient of the received chirp.

Suitably, the output of the correlator 716 is input into buffers 720. If a received symbol comprises a plurality of identical chirps, then the correlator output for each constituent chirp is stored in buffers 720. The correlator outputs of the identical chirps are then coherently integrated in coherent integrator 722.

Suitably, the output of the buffers 720 is input to an absolute value module 724. The absolute value module returns the magnitude of the complex signal input from the correlator 716. The output of absolute value module 724 is input to further buffers 726. Peak locator module 728 then detects the position of the correlation peaks, and performs the determination of the frequency and time offsets described herein. Non-coherent integration is performed in non-coherent integrator 730.

Suitably, the linear interpolator 706 in the adjustment unit 732 is used to adjust for the fractional timing offset whilst the remainder of the synchronisation signal is still being received. The interpolator achieves this by adjusting the interpolator's phase. Suitably, the frequency mixer 702 in the adjustment unit 732 is used to adjust for the fractional frequency offset whilst the remainder of the synchronisation signal is still being received. Consequently, the received chirps subsequent to the first chirp are corrected for the fractional offsets prior to being correlated. This enables a more accurate subsequent determination of the timing and frequency offsets.

The timing obtained with the described approach is modulo N samples. This means that if each symbol has R chirps, it is ambiguous as to which of the R chirps the timing offset refers to. Suitably, the received symbols of the received synchronisation signal are stored in buffer 700. A first determination of the integer timing and frequency offsets is made after the analysis of the first two symbols of the synchronisation chirp. Suitably, the buffered symbols are then output from the buffer for a second time. The timing and frequency of the buffered symbols are adjusted by the adjustment unit 732 as previously described. The buffered symbols are then correlated in correlator 716 as previously described. The end of one symbol and the beginning of the next is detectable from the correlator output. Instead of storing the received symbols and outputting them from the buffer a second time, a longer synchronisation signal may be used. In this case, after two symbols, the offsets are determined and applied to the third and further symbols in the synchronisation signal. The chirps of the third symbol and some chirps of the second and fourth symbols are all multiplied with a generated chirp having a gradient of 1 minus the expected gradient of the third symbol. In this subsequent correlation the chirps forming the third symbol are identifiable because they yield the highest correlation peaks. Consequently, the beginning of the symbol has been identified.

The analysis of third and further symbols in the synchronisation signal enables the receiver to determine the fractional timing and frequency offsets more accurately.

If the received signal has timing and frequency offsets that are not exact integers, then the main peak magnitude will be reduced in size. At worst case the fractional frequency and timing offsets could be 0.5, and the signal level would reduce to 0.25 of its maximum level. This reduces the sensitivity of the receiver to the received signal. Suitably, the received symbols of the synchronisation signal are buffered in buffer 700 and, following a first determination of the timing and frequency offsets, are outputted again. Fractional timing offsets are applied to the buffered chirps using interpolator 706. Fractional frequency offsets are applied to the buffered chirps using mixer 702. Suitably, a plurality of combinations of fractional timing and frequency offsets are applied to the buffered chirps, and each of these combinations goes on to be mixed with a generated chirp and correlated as previously described. The combination of fractional offsets that yields the largest correlation peak is selected as indicating the fractional offset. Further adjustment of the relative timing and frequency of the receiver and the received signal is performed based on these measurements. This approach increases the sensitivity of the receiver during synchronisation.

Typically, the error of the crystals in the transmitter and receiver is of the order of 50 ppm or more. To improve sensitivity and reduce interference to other users it is desirable to minimise the bandwidth utilised for synchronisation. However, this leads to a situation where the errors in the frequency of the signal may be larger than the bandwidth of the signal. Suitably, the data from the receiver is oversampled in order to allow for the uncertainty in the frequency of the received signal. For example, the sample rate into the buffer is suitably 400 kHz, whereas the chirp sample rate is 100 kHz. In this case, the 400 kHz signal may be read seven times to cover the frequency uncertainty range of −150 to +150 kHz in steps of 50 kHz. The oversampled data is stored in buffers 700. The output of the buffers is mixed down from each of a plurality of candidate frequency offsets to DC in mixer 702. Any of these candidate frequency offsets may include the synchronisation signal. The data is then filtered in low pass filter 704, and then sampled using interpolator 706 to yield a chirp-rate baseband signal. This process is repeated for each of the candidate frequency offsets. The synchronisation method described herein is carried out for each of these candidate frequency offsets. The candidate frequency offset that yields the largest correlator peak output is then added to the result of the frequency estimation using the techniques described above. This gives the total frequency offset of the received signal. Once the candidate frequency has been established, subsequent parts of the synchronisation signal and the remainder of the message can be acquired at the lower baseband chirp rate, by adjusting the frequency of the signal into the buffer, and sampling it at a lower rate. This improves the power performance of the receiver.

FIG. 7 illustrates a schematic diagram showing exemplary components of a receiver according to the methods described herein. This figure illustrates the layout of the receiver in terms of functional boxes. The operations of one or more of these functional boxes may be combined. It is understood that this figure does not illustrate those conventional components of a receiver known to a person skilled in the art.

In a specific example, the received synchronisation chirp signal comprises chirps, wherein each chirp is described by a Zadoff-Chu code. Suitably, contiguous symbols have different Zadoff-Chu codes. Suitably, contiguous symbols also have different center frequencies. Using different Zadoff-Chu codes for each symbol provides a degree of coded separation, allowing more than one user to use the frequency spectrum at the same time.

Suitably, the frequency channel is fixed during synchronisation, i.e. there is no frequency hopping in the synchronisation signal.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of synchronising the frequency and timing of a receiver with a synchronisation chirp signal from a transmitter, comprising:
   receiving the synchronisation chirp signal, the synchronisation chirp signal comprising a sequence of symbols, the sequence of symbols including at least a first symbol having a first gradient $g_1$ and a second symbol having a second gradient $g_2$, wherein the magnitudes of the first gradient and the second gradient are both greater than one, and the magnitude of the first gradient is different to the magnitude of the second gradient;
   correlating the sequence of received symbols with expected symbols to form a correlator output;
   determining timing and frequency offsets between the transmitter and the receiver from the correlator output; and
   adjusting the relative timing and frequency of the receiver and the synchronisation signal by the determined timing and frequency offsets.

2. A method according to claim 1, wherein determining the timing and frequency offsets comprises determining fractional timing and frequency offsets between the transmitter and the receiver.

3. A method according to claim 2, wherein each received symbol comprises one or more identical chirps, each chirp having N samples, and wherein the fractional timing offset is a function of the magnitude of the correlator output at the expected integer timing offset and a function of the magnitude of the correlator output at g samples from the expected integer timing offset.

4. A method according to claim 3, wherein the fractional timing offset is a function of the magnitude of the correlator output at the expected integer timing offset and a function of the magnitude of the correlator output at g samples prior to the expected integer timing offset.

5. A method according to claim 3, wherein the fractional timing offset is a function of the magnitude of the correlator output at the expected integer timing offset and a function of the magnitude of the correlator output at g samples after to the expected integer timing offset.

6. A method according to claim 2, wherein each received symbol comprises one or more identical chirps, each chirp having N samples, and wherein the fractional frequency offset is a function of the magnitude of the correlator output at the expected integer timing offset and a function of the magnitude of the correlator output at one sample from the expected integer timing offset.

7. A method according to claim 6, wherein the fractional frequency offset is a function of the magnitude of the correlator output at the expected integer timing offset and a function of the magnitude of the correlator output at one sample prior to the expected integer timing offset.

8. A method according to claim 6, wherein the fractional frequency offset is a function of the magnitude of the correlator output at the expected integer timing offset and a function of the magnitude of the correlator output at one sample after to the expected integer timing offset.

9. A method according to claim 1, wherein determining the timing and frequency offsets comprises determining integer timing and frequency offsets between the transmitter and the receiver.

10. A method according to claim 9, comprising determining integer timing and frequency offsets from the correlator peak position of the first symbol and the correlator peak position of the second symbol.

11. A method according to claim 1, further comprising:
    buffering the received symbols;
    after the step of adjusting the relative timing and frequency of the receiver and the synchronisation signal, extracting the buffered received symbols;
    correlating the sequence of buffered received symbols with expected symbols to form a correlator output;
    determining timing and frequency offsets between the transmitter and the receiver from the correlator output; and
    adjusting the relative timing and frequency of the receiver and the synchronisation signal by the determined timing and frequency offsets.

12. A method according to claim 1, further comprising:
    buffering the received symbols;
    after the step of adjusting relative timing and frequency of the receiver and the synchronisation signal, extracting the buffered received symbols;
    applying fractional time offsets and fractional frequency offsets to the extracted buffered received symbols to form a set of offset received symbols;
    correlating the sequence of offset received symbols with expected symbols to form a correlator output;
    determining timing and frequency offsets between the transmitter and the receiver from the correlator output; and adjusting the relative timing and frequency of the receiver and the synchronisation signal by the determined timing and frequency offsets.

13. A chirp receiver comprising:
a receiving unit configured to receive a synchronisation chirp signal, the synchronisation chirp signal comprising a sequence of symbols, the sequence of symbols including at least a first symbol having a first gradient $g_1$ and a second symbol having a second gradient $g_2$, wherein the magnitudes of the first gradient and the second gradient are both greater than one, and the magnitude of the first gradient is different to the magnitude of the second gradient;
a correlator configured to correlate the sequence of received symbols with expected symbols to form a correlator output;
a determination unit configured to determine timing and frequency offsets between the transmitter and the receiver from the correlator output; and
an adjustment unit configured to adjust the relative timing and frequency of the receiver and the synchronisation signal by the determined timing and frequency offsets.

14. A chirp receiver according to claim 13, wherein the determination unit is configured to determine fractional timing and frequency offsets between the transmitter and the receiver.

15. A chirp receiver according to claim 13, wherein the determination unit is configured to determine the integer timing and frequency offsets between the transmitter and the receiver.

16. A chirp receiver according to claim 13, wherein the correlator is configured to correlate each received symbol in the sequence of received symbols with an expected symbol having a gradient matching the gradient of the received symbol.

17. A chirp receiver according to claim 13, wherein the correlator is configured to:
mix the first symbol with a generated symbol having a gradient $1-g_1$ to form a first mixed symbol;
mix the second symbol with a generated symbol having a gradient $1-g_2$ to form a second mixed symbol; and
correlate both the first mixed symbol and the second mixed symbol with a symbol having unity gradient.

18. A chirp receiver as claimed in claim 13, further comprising a processor configured to negotiate the gradients of the symbols in the synchronisation chirp signal between the transmitter and the receiver.

19. A chirp receiver as claimed in claim 13, further comprising a buffer configured to buffer the received symbols.

20. A chirp receiver as claimed in claim 13, further comprising:
a buffer configured to buffer the received symbols;
a linear interpolator configured to apply fractional time offsets to the buffered received symbols; and
a mixer configured to apply a fractional frequency offset to the buffered received symbols.

* * * * *